G. H. Cross,
Steam Confection Pan,
No. 64,497.                    Patented May 7, 1867.
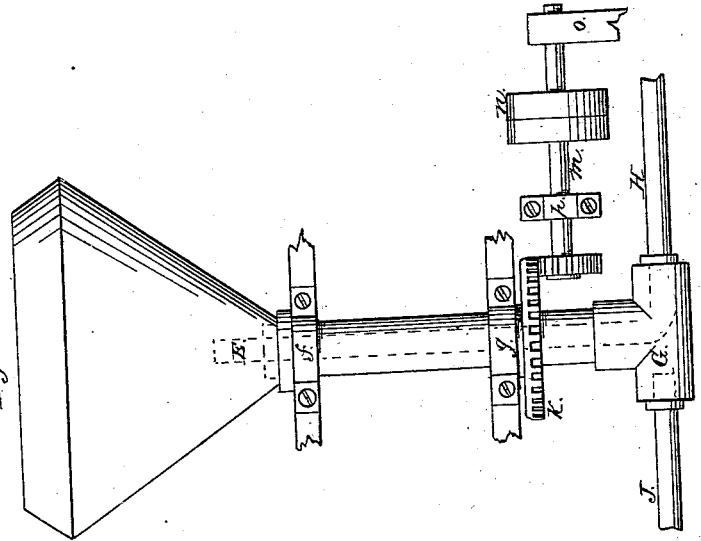
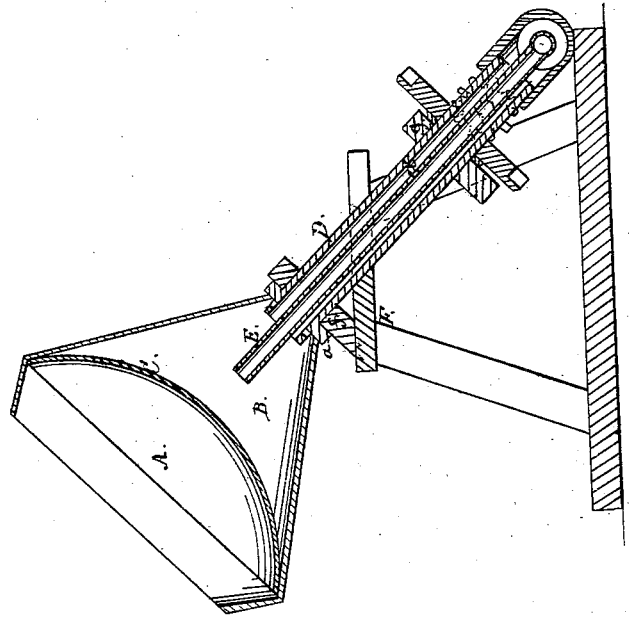
Witnesses:
Theo Tusche
Wm Truorn
Inventor:
Geo H Cross
Per Munn
Attorneys

United States Patent Office.

GEORGE H. CROSS, OF MONTPELIER, VERMONT.

Letters Patent No. 64,497, dated May 7, 1867.

IMPROVED STEAM CONFECTION-PAN.

*The Schedule referred to in these Letters Patent and making part of the same.*

TO ALL WHOM IT MAY CONCERN:

Be it known that I, GEORGE H. CROSS, of Montpelier, in the county of Washington, and State of Vermont, have invented a new and improved Steam Confection-Pan; and I do hereby declare that the following is a full, clear, and exact description thereof, which will enable others skilled in the art to make and use the same, reference being had to the accompanying drawings, forming part of this specification.

This invention consists in arranging a funnel-shaped pan with a false bottom in a suitable frame. The shaft (or what would be the neck of the funnel) stands in the frame at an angle of about forty-five degrees. The lower portion of the pan forms a steam-chamber, and the funnel is revolved by suitable gearing, as will be hereinafter described.

Figure 1 represents a vertical section of the apparatus, showing the frames, the steam pipe, the steam-chamber, and the neck or hollow shaft of the pan.

Figure 2 represents a side view of the apparatus complete.

Similar letters of reference indicate like parts.

A, fig. 1, is the open part of the pan; B is the steam-space or chamber; C is the false bottom; D is the neck or shaft of the pan; E is the steam pipe; F represents the frame. In fig. 2, G is a reversed T pipe, which is stationary, and which receives the end of the revolving shaft D of the pan. This bearing or joint is designed to be steam and water-tight. The steam is conducted into the reversed T through the pipe H, which connects by a steam-tight joint with the steam pipe E in the reversed T. J is a pipe attached to the other end of the reversed T; this pipe is for the discharge of the water of condensation from the steam-chamber B. It will be seen that the hollow shaft or neck of the pan extends up into the steam-chamber a short distance, and that there are holes through the upper end to admit the water of condensation; these holes are seen at $a$, fig. 1. There is a space, $d$, around the steam pipe E, inside of the hollow shaft D, which allows the water of condensation to pass down the hollow shaft and out at the pipe J. K is a gear-wheel attached to the hollow shaft, and L is a pinion, which is attached to a horizontal shaft, $m$. $n$ is a pulley on the shaft $m$. The shaft may be revolved by a belt on this pulley, or by a crank on its end. This shaft $m$ is supported by a stand, $o$, and by a box, $p$, which is attached to the frame.

When in practical operation the confectionery is placed in the pan A; the steam is let into the steam-chamber B through the pipes H and E, and the pan is revolved. The bearings which support the hollow shaft D with the pan are seen at $f$ and $g$.

What I claim as new, and desire to secure by Letters Patent, is—

The hollow shaft D, attached to the pan, the steam pipe E, passing through the shaft, the reversed T, G, and the pipes H and J, in combination with a steam confectioner's pan, the whole constructed, arranged, and operating substantially as herein shown and described.

GEORGE H. CROSS.

Witnesses:
EDWARD P. RICHARDSON,
ISAAC M. WRIGHT.